Oct. 14, 1941.  E. C. STOELTING  2,259,218
PIVOTAL LATHE CARRIAGE
Filed May 25, 1940   2 Sheets-Sheet 1

Inventor
Erwin C. Stoelting
By Clarence A. O'Brien
Attorney

Oct. 14, 1941.   E. C. STOELTING   2,259,218
PIVOTAL LATHE CARRIAGE
Filed May 25, 1940    2 Sheets-Sheet 2
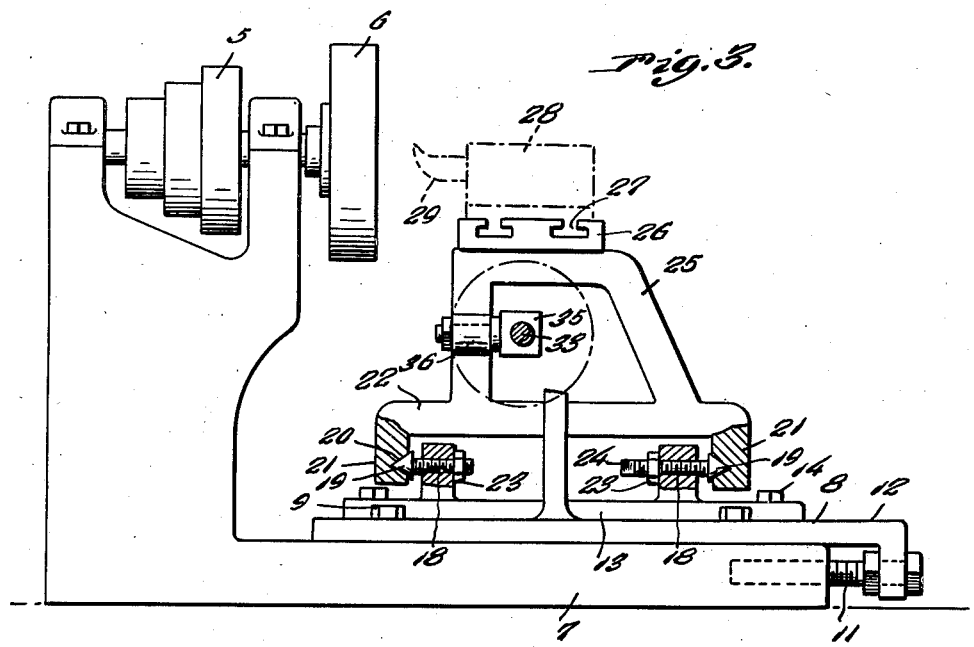
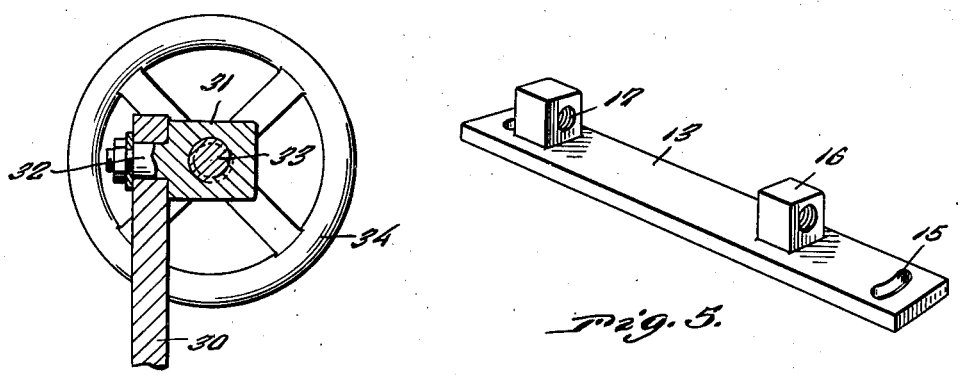
Inventor
Erwin C. Stoelting
By Clarence A. O'Brien
Attorney Patented Oct. 14, 1941

2,259,218

UNITED STATES PATENT OFFICE 2,259,218

PIVOTAL LATHE CARRIAGE

Erwin C. Stoelting, Niagara Falls, N. Y.

Application May 25, 1940, Serial No. 337,291

6 Claims. (Cl. 82—2)

The present invention relates to new and useful improvements in lathe carriages and has for its primary object to provide means for pivotally supporting the carriage to which the cutting or facing tool is attached for movement of the tool into and out of engagement with the work.

The present invention is designed primarily for use in facing abrasive wheels when they leave the mold, and in the present practice the wheels are faced on a lathe using conventional slide carriages or ways. The dust and minute particles removed from the wheels falls on the sliding carriage which causes wear on the track and produces excessive play in the sliding carriage and causes inaccuracy in the finishing of the wheel.

It is accordingly an object of the present invention to provide a pivotally mounted carriage for holding the tool and embodying a construction in which the pivotal support for the carriage is protected from any possibility of the dust or particles collecting thereon.

A further object of the invention is to provide an apparatus of this character of simple and practical construction, which is efficient in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 3 is a front elevational view of the carriage with parts broken away and shown in section, Figure 4 is a sectional view taken substantially on a line 4—4 of Figure 2, and Figure 5 is a perspective view of the adjustable support for the pivot of the carriage.

Figure 1:
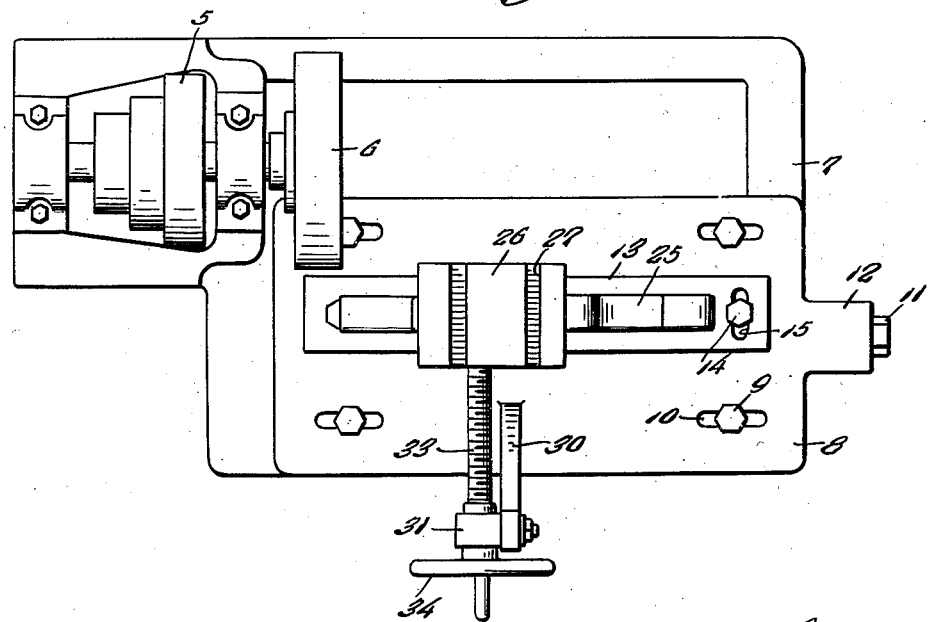
Figure 1 is a top plan view.
Figure 2:
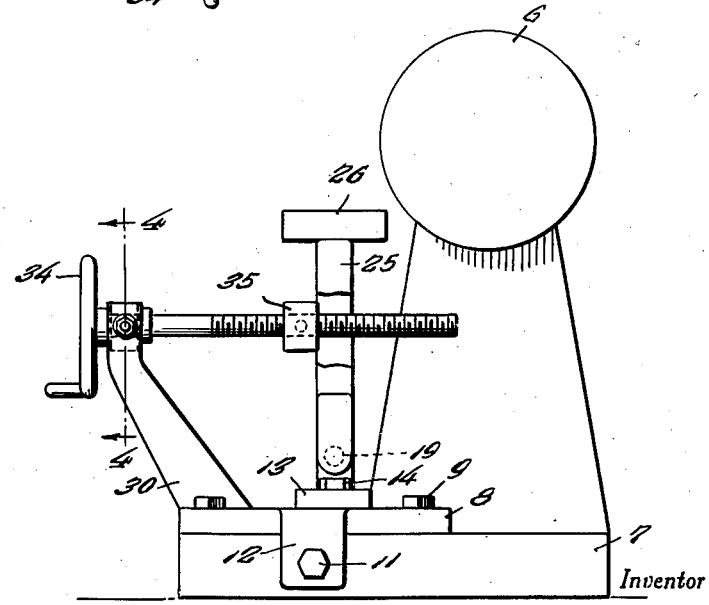
Figure 2 is an end elevational view.

Referring now to the drawings in detail, the numeral 5 designates the lathe generally of conventional construction on which the work 6 is rotatably mounted, the work representing an abrasive wheel.

The base of the lathe extends forwardly as shown at 7 to which is secured the carriage anchoring plate shown at 8 by means of bolts 9 adjustable in slots 10 formed in the plate. A set screw 11 is threaded through an extension 12 formed on the plate for adjusting the plate toward or away from the wheel 6.

A carriage supporting plate shown at 13 is secured to the upper surface of the plate 8 by means of bolts 14, the bolts being inserted through arcuate slotted openings 15 formed in the carriage supporting plate 13 to provide for limited swinging adjustment of the latter in a horizontal plane. Rising from the plate 13 are a pair of spaced lugs 16 having threaded horizontal bores 17 therein and adapted for receiving screws 18, one end of each of which is provided with a conical head 19 extending in opposite directions.

The conical heads 19 are adapted for insertion in the complementary shaped recesses 20 formed on the opposed faces of the downturned ends 21 of an elongated carriage 22. The base of the carriage is in the form of an elongated bar with its downturned ends 21 pivoted on the conical heads 19 of the screws 18, the screws being secured in adjusted position by means of nuts 23. One of the screws is provided with a polygonal adjusting head 24.

Rising from the carriage is a frame 25 on the upper edge of which is secured the table 26 having the spaced parallel slots 27 formed therein for receiving the cutting tool designated by the dotted lines at 28, the tool embodying a cutter 29 disposed in position for movement across the face of the wheel 6 as shown to advantage in Figure 3 of the drawings.

Rising from the anchoring plate 8 is an upstanding arm 30 having a bearing block 31 pivotally secured on a pin 32 at the upper end of the arm and projecting horizontally therefrom. Journalled in the block 31 is a screw 33 having an operating wheel 34 at one end and having its opposite end threaded through a guide 35 pivoted on one side of the frame 25 as shown at 36.

From the foregoing it will be apparent that the screw 33 is adapted to feed the cutter 29 across the face of the wheel 6 by reason of the pivotal mounting of the bottom of the carriage on the heads 19 of the screws.

It is believed the details of construction, advantages and manner of use of the device will be readily understood from the foregoing without further detailed explanation.

What I claim is:

1. A tool support for lathes comprising a base, a plate having its opposite ends connected to the base for horizontal swinging adjustment on the base, tapered bearing pins carried by the plate and an upstanding tool-holding carriage pivotally mounted on said pins.

2. A tool support for lathes comprising a base, a plate positioned on the base, means connecting the plate to the base for horizontal swinging adjustment of opposite ends of the plate on the base, a pair of lugs rising from the plate, pins horizontally supported on the lugs and an upstanding tool-holding carriage pivotally mounted on the pins for rocking movement on a horizontal axis.

3. A tool support for lathes comprising a base, a plate swingably adjustable horizontally on the base, a pair of lugs rising from the plate, a pair of horizontal pins threaded in the lugs and having oppositely extending conical heads and an upstanding tool-holding carriage having recesses conformably receiving said heads for pivotally supporting the carriage for rocking movement on a horizontal axis.

4. A tool support for lathes comprising a base, a plate swingably adjustable horizontally on the base, a pair of lugs rising from the plate, a pair of horizontal pins threaded in the lugs and having oppositely extending conical heads, an upstanding tool-holding carriage having recesses conformably receiving said heads and manually operable means connected to the carriage for rockably actuating the same on a horizontal axis.

5. A tool support for lathes comprising a base, a plate swingably adjustable horizontally on the base, a pair of lugs rising from the plate, a pair of horizontal pins threaded in the lugs and having oppositely extending conical heads and an upstanding tool-holding carriage having downwardly extending parallel portions provided with recesses in their opposed faces for conformably receiving said heads to pivotally support the carriage on said pins for rocking movement on a horizontal axis.

6. A tool support for lathes comprising a base, a plate adjustable horizontally on the base, a pair of lugs rising from the plate, a pair of horizontal pins threaded in the lugs and having oppositely extending conical heads and a tool-holding carriage having downwardly extending parallel portions provided with recesses in their opposed faces for conformably receiving said heads to pivotally support the carriage on said pins, a support rising from the base, and a screw carried by the support and engaging the carriage for rockably actuating the latter.

ERWIN C. STOELTING.